(12) United States Patent
Yazdani-Pedram et al.

(10) Patent No.: US 8,664,308 B2
(45) Date of Patent: Mar. 4, 2014

(54) COMPATIBILIZERS FOR PRODUCING NANOCOMPOSITES, MICROCOMPOSITES AND POLYMER BLENDS AND PROCESS FOR OBTAINING THEM

(75) Inventors: Mehrdad Yazdani-Pedram, Santiago (CL); Raúl Quijada Abarca, Vitacura (CL); Edwin Alexander Moncada Acevedo, Santiago (CL)

(73) Assignee: Universidad de Chile, Santiago (CL)

( * ) Notice: Subject to any disclaimer, the term of this patent is extended or adjusted under 35 U.S.C. 154(b) by 273 days.

(21) Appl. No.: 12/445,080

(22) PCT Filed: Oct. 10, 2007

(86) PCT No.: PCT/IB2007/003008
§ 371 (c)(1),
(2), (4) Date: Mar. 3, 2010

(87) PCT Pub. No.: WO2008/044121
PCT Pub. Date: Apr. 17, 2008

(65) Prior Publication Data
US 2010/0160509 A1    Jun. 24, 2010

(30) Foreign Application Priority Data
Oct. 11, 2006   (CL) .................................. 2729-2006

(51) Int. Cl.
*C08K 5/53* (2006.01)
*C08K 5/00* (2006.01)

(52) U.S. Cl.
USPC .......................................... 524/131; 524/291

(58) Field of Classification Search
USPC ........................................................ 524/131
See application file for complete search history.

(56) References Cited

U.S. PATENT DOCUMENTS

| | | | | |
|---|---|---|---|---|
| 3,849,516 A * | 11/1974 | Plank | ............................. | 524/282 |
| 5,124,181 A * | 6/1992 | Schaffer et al. | ............... | 427/323 |
| 5,137,975 A * | 8/1992 | Kelusky | ......................... | 525/263 |
| 5,451,639 A * | 9/1995 | Marczinke et al. | ........... | 525/193 |
| 5,476,905 A * | 12/1995 | Schwager et al. | ............. | 525/301 |
| 6,399,191 B1 * | 6/2002 | Wong | ............................ | 428/344 |

FOREIGN PATENT DOCUMENTS

| | | | |
|---|---|---|---|
| DE | 40 22 570 | 1/1992 | |
| DE | 43 08 588 | 9/1994 | |
| DE | 43 08 590 | 9/1994 | |
| EP | 0 370 735 | 5/1990 | |
| EP | 0 370 736 | 5/1990 | |
| EP | 370735 A2 * | 5/1990 | .............. B29C 47/04 |

OTHER PUBLICATIONS

Moncada et al., Macromol. Chem. Phys., 207, 1376-1386, 2006.*
Pesetskii et al. "Free Radical Grafting of Itaconic Acid and Glycidyl Methacrylate onto PP Initiated by Organic Peroxides." *Journal of Applied Polymer Science*. vol. 86. 2002. pp. 64-72.

* cited by examiner

*Primary Examiner* — Hui Chin
(74) *Attorney, Agent, or Firm* — Merchant & Gould P.C.

(57) ABSTRACT

The present invention relates to compatibilizers to be used for obtaining materials called polyolefin nanocomposites, microcomposites and polymer blends, and it includes the process for obtaining such compatibilizers. Such compatibilizers are obtained from the monomers of the organic compounds itaconic acid (ITA) or its monooctadecyl itaconate (MODIT) derivative. The compatibilizers are polyolefins grafted with those monomers, which are characterized by having functional groups with a hydrophilic character and a polymer backbone with a hydrophobic character. The compatibilizers of this invention are characterized by having controlled degrees of grafting of these monomers, and they can be used optimally in various applications. It also relates to the process for obtaining such compatibilizers.

6 Claims, No Drawings

COMPATIBILIZERS FOR PRODUCING NANOCOMPOSITES, MICROCOMPOSITES AND POLYMER BLENDS AND PROCESS FOR OBTAINING THEM

DESCRIPTION OF THE INVENTION

This application is a National Stage Application of PCT/IB2007/003008, filed 10 Oct. 2007, which claims benefit of Serial No. 2729-2006, filed 11 Oct. 2006 in Chile and which application(s) are incorporated herein by reference. To the extent appropriate, a claim of priority is made to each of the above disclosed applications.

PURPOSE OF THE INVENTION

The present invention comprises new compatibilizers to be used for obtaining materials called nanocomposites, microcomposites, and polymer blends of polyolefins, and it includes the process for obtaining such compatibilizers. Those compatibilizers are obtained from the monomers of the organic compounds itaconic acid (ITA) or its monooctadecyl itaconate (MODIT) derivative. The compatibilizers are polyolefins grafted with theses monomers, which are characterized by having functional groups with a hydrophilic character and a polymer backbone with a hydrophobic character. The compatibilizers of this invention are characterized by having controlled degrees of grafting of these monomers, and they may be used optimally according to their application. For example, the compatibilizers of this invention allow modified clays to be dispersed in polyolefin matrices to form clay nanocomposites, as well as to prepare microcomposites facilitating the dispersion of polar microparticles in the polyolefins and also to produce polyolefin and elastomer blends, improving the interaction between polyolefins and elastomers. With the present invention nanocomposites, microcomposites and polyolefin blends can be obtained that are characterized by an improved mechanical and thermal behavior compared to that of nanocomposites, microcomposites and polyolefin blends that use compatibilizers such as polyolefins grafted with maleic anhydride. The nanocomposites, microcomposites and blends obtained from this invention may be used in all the fields and applications which require them, such as the automotive, electronics, packaging, textile and construction fields, among others.

TECHNICAL FIELD

With polyolefins like polyethylene and polypropylene one can manufacture a variety of finished molded or injected products, tubes, thin films and fibers that have excellent chemical, physical and mechanical properties. These polyolefins, however, have disadvantages that restrict considerably their applications. For example, if a polyolefin is used as a structural plastic, it may be inadequate for that purpose because of its insufficient mechanical resistance, dimensional stability and resistance to temperature changes. With the purpose of reinforcing these properties, the incorporation of reinforcing materials like glass fibers or of an inorganic reinforcement in the polyolefin can improve those properties. This procedure, however, is insufficient to provide effective reinforcement because the adhesion between the reinforcement and the polyolefin is not strong. For that reason there are alternative procedures that have been implemented for reinforcing polyolefins, such as, for example, the use of block copolymers or graft copolymeros that contain polar groups as compatibilizers, which are applied to improve the adhesion of the reinforcement with the polyolefin, thus improving its mechanical properties.

Materials made of organic and inorganic compounds, of polymers and inorganic reinforcements of nanometric size are innovative materials that are currently being investigated and developed. These materials or composites have a double phase in which at least one of them is dispersed in a nanometric or micrometric state. Compatibility between the two phases, such as clay and polymer, for example, is always essential for good dispersion. In the case of siliceous laminar clays, which are hydrophylic and immiscible with organic compounds, the space between the sheets is modified when an organic compound like a quaternary ammonium salt is introduced as an intercalation agent. In principle, the space between the sheets is increased by the intercalation agents, and it needs to be sufficiently wide to facilitate the entry of polymer molecules to obtain intercalated and/or exfoliated composite. In the case of exfoliation the distance between the sheets disappears and the clay sheets are dispersed randomly in the polymer matrix.

Commercial intercalation agents like the protonated aliphatic amines are appropriate for smectic type clays like montmorillonite, which can be dispersed in different polymer matrices to obtain a compound nanomaterial or nanocomposite. Those kinds of intercalation agents can increase the interlaminar distance of the clay to the order of 13 to 18 Å. Thus it is possible to obtain a compound based on a polymer matrix and the clay which is found in some degree of dispersion, intercalated and/or partially or totally exfoliated.

Japanese patent No. 8-22946 applies the first commercial inorganic/organic-polymer nanocomposite. This composite is produced by dispersing montmorillonite intercalated with an amino-carboxylic acid $(H_3N^+(CH_2)_{11}COO^-)$ in poly(c-caprolactam) or Nylon 6. In the case of nonpolar polymers like polyethylene and polypropylene, compounds like amino-carboxylic acids do not allow dispersion of the clays, which are hydrophilic in these polymers. Moreover, other intercalation agents for clays have been reported that allow the interlaminar distance to be increased. However, these agents do not modify sufficiently the polarity of the clays. The main problem will therefore be the loss of compatibility between the hydrophilic clay and the nonpolar hydrophobic organic polymer.

PRIOR ART

Polypropylene (PP) has been recognized as one of the most widely used thermoplastics in recent years because of its high availability in the market, its wide range of properties, and its low cost. In spite of all these advantages, PP has some deficiencies for certain applications, like its low impact resistance at low temperatures, for example. To overcome these deficiencies, one of the alternative methods is to prepare composites by mixing the polymer with micro- and/or nanometric-sized reinforcements. The challenge of achieving a good result using this alternative method refers to the optimization of the adhesion of the reinforcing material with the polymer matrix, and this results in an increase of the degree de dispersion and a reduction in the size of the reinforcement, as well as an increase of the interfacial interaction between the components of the mixture.

Reinforcements based on particles, whether they are in the micrometer or the nanometer size range, are characterized by the different degree of surface to volume ratio. The optimization of this ratio is an important parameter when these particles are used as reinforcing agents for polymers. Some examples are the studies on the SiO$_2$/PP system composites with micro- or nanoparticles of SiO$_2$, in which a slight improvement is achieved in mechanical properties such as impact and tensile resistance as well as elongation at breakage. However, the use of PP grafted with maleic anhydride groups as compatibilizers allowed the elimination of silica aglomerates in the composite and therefore improved its mechanical properties and the particle/PP-matrix interface.

On the other hand, research on polymer materials with new property profiles has stimulated interest in polymer blends and reactive processes. In recent years many new blends have been developed in the market. Although some of them are homogeneous mixtures of polymers, most of the commercial blends consist of immiscible polymers and contain two or more polymer phases. This is due to poor polymer-polymer interaction. Their properties depend on composition as well as on morphology, and they can be improved dramatically by adding an adequate compatibilizer, and therefore they are incompatible and have low tensile and impact resistance. An effective compatibilizer is obtained, for example, by grafting a compound that has carboxyl groups. In those cases the variables to be considered are compatibilizer concentration and mixing strategies in the morphology of the blends, as well as the effect of their morphology on mechanical properties and crystallization behavior.

Among the compounds used most commonly as raw materials to obtain polyolefin and polar compatibilizers are monomers with a hydrophilic character and in particular mono-, di- or polycarboxylic organic compounds, in addition to the aforementioned maleic anhydride, among others. Itaconic acid (ITA) is therefore a polar organic compound that has been used as additive in combination with other similar organic compounds in materials formulations. However, the authors of this invention have reported in the scientific literature only the specific grafting of ITA with a polyolefin in solution, that is, using aromatic solvents. In this way a low degree of ITA grafting on the polyolefin and extensive degradation of the polyolefin are achieved. Moreover, an excessive use of high cost and harmful aromatic solvent is required. The ITA or MODIT in this invention have been grafted in a controlled manner on polyolefins for the preparation of compatibilizers, and the degree of degradation of the initial polymer is also restricted. The use of the compatibilizers obtained in the present invention for the preparation of composites and polyolefin blends comprises, on the one hand, a new and alternative procedure, and on the other hand it is used alone and without considering prior treatments or mixtures with other similar organic compounds.

SUMMARY

The present invention relates to compatibilizers produced by the grafting reaction in the molten state of organic compounds like the monomers of itaconic acid and/or its monooctadecyl itaconate derivative on polyolefins, characterized by having different degrees of grafting of those monomers in the polyolefin. It also relates to the processes for:
i) Obtaining these compatibilizers with a predefined (controlled) degree of grafting.
ii) Determination of the degree of monomer grafting on the polyolefin in the compatibilizers.
iii) Obtaining nanocomposites, microcomposites and polyolefin blends using these compatibilizers. These composites and blends are applicable in the automotive, electronics, packaging, textile and construction industries, among others. The components of these composites and polyolefin blends are mainly: i) nanoparticles or microparticles of elastomers; ii) compatibilizers of this invention; and iii) antioxidants. With the present invention one can obtain nanocomposites, microcomposites and polyolefin blends using compatibilizers of this invention (polyolefins grafted with monomers with a controlled degree of grafting) with an improved mechanical and thermal behavior with respect to the nanocomposites, microcomposites and polyolefin blends that use organic compounds and compatibilizers such as polyolefins grafted with maleic anhydride, among others.

For a better understanding of the invention, the following terms are defined as:
1. compatibilizer: an organic compound that allows two or more chemicals such as, for example, a polymer and micro- or nanometric particles to mix without separating.
2. composite: a material formed by more than one component such as a polymer and another kind of material such as particles.
3. nanocomposite: a material formed by a component of nanometer-size particles in a macroscopic component like a polymer matrix.
4. microcomposite: a material formed by a component of micrometer-size particles in a macroscopic component like a polymer matrix.
5. polyolefin: compounds based on ethylene and propylene homopolymers as well as copolymers of these homopolymers with alpha olefins.
6. blend: a homogeneous macroscopic mixture of two or more different polymers.
7. masterbatch: material formed by a polymer and an additive in particle form and whose composition is high in additive. Thus, this material is a base for obtaining other materials with lower concentration of the same additive. That is, for example, a masterbatch of polymer and clay particles for obtaining a polymer and clay nanocomposite.
8. polydispersity: an indication of the degree of variation or amplitude of a Gaussian curve that represents the molecular weights of a polymer.
9. elastomer: it is often used interchangeably with the term rubber. Elastomer is derived from two terms, elastic (describing the ability of a material to return to its original shape when a load is far and mer (from polymer, where poly means many and mer means parts).

DETAILED DESCRIPTION OF THE INVENTION

Specifically, this invention relates to compatibilizers such as, for example, polyolefin grafted with the monomer of itaconic acid (ITA) or its monooctadecyl itaconate (MODIT) derivative. These compatibilizers are characterized particularly by having a controlled and reproducible degree of monomer grafting.

The invention also relates to the use of these compatibilizers to obtain nanocomposites, microcomposites and polyolefin blends, and it also describes the procedure for obtaining them.

The compatibilizers are produced by means of a procedure starting from the grafting reaction of the monomers on a polyolefin by melt mixing and the use of initiators and antioxidants.

Moreover, the process for obtaining the nanocomposites, microcomposites and polyolefin blends using the compatibilizers developed in this invention comprises the dosing and sequential mixing of the components of the nanocomposite or microcomposite or blend, that is: i) molten polyolefins; ii) nanoparticles or modified nanoparticles or microparticles or elastomers or modified elastomers; iii) compatibilizers of this invention; and iv) antioxidants, all this in a stream of an inert gas like nitrogen, argon, helium, among others, followed by pressing the resultant material of the mixing, and finally grinding the pressed material.

The present invention comprises:

1. Use of alternative organic substances as compatibilizers to be applied for obtaining nanocomposites, microcomposites and polymer blends.

These organic substances or compatibilizers considered in this invention include the preparation of polyolefins with a polar character by means of the incorporation of polar groups from the ITA or its MODIT derivative.

Some of these alternative organic substances are polyolefins modified with ITA or its MODIT derivative incorporated in their polymer chains. That is, a compound based on a polyolefin that contains polar carboxyl and/or ester groups from the ITA or its MODIT derivative. Moreover, these modified polyolefins developed in this invention as alternative organic substances, have a higher degree of polarity than similar compounds such as polyolefins grafted with maleic anhydride (MAA). Also, these modified polyolefins are characterized by having a controlled degree of grafting of the monomers in the polymer matrix. The most widely used organic substances are polyolefins modified with MAA that have a lower degree of polarity than the organic substances developed in this invention.

Furthermore, it must be pointed out that the compounds considered in this invention use ITA, which has the great advantage of being obtained from natural and renewable resources, that is, they are obtained, for example, by the fermentation of molasses, while maleic anhydride is a synthetic product, not a natural one.

In particular, the ITA monomer that is used in this invention has also found other applications in the development of some materials with specific functions due to its hydrophilic character as well as because of its high chemical reactivity associated with its carboxyl groups. However, in all its aplications, described in numerous scientific papers as well as in industrial patents, it is used together with other compounds with similar polarity in various polymer formulations, but not as a compatibilizer.

On the other hand, the use of the MODIT monomer has not been reported so far either in the scientific literature or in industrial patents leading to the preparation of some compound or material as in the applications described in this invention.

These alternative organic substances are then treated with polyolefins to prepare the compatibilizers of this invention.

2. Procedure for obtaining these organic substances as compatibilizers as well as for obtaining nanocomposites, microcomposites and polymer blends.

The preparation of the organic substances such as the polar polyolefins takes place by a procedure like the grafting reaction of polar organic compounds such as ITA or its MODIT derivative to the polyolefins. The grafting reaction comprises a process in the molten state between the polyolefin and the polar organic compound in a discontinuous mixer.

This mixing procedure makes it possible to prepare polar polyolefins with a high and controlled degree of grafting of the organic compound, for example itaconic acid, which corresponds to a procedure that is different from the process that uses specially designed extruders to carry out the same kind of modifications, as in the case of the grafting of MAA on the polyolefins.

Moreover, the use of extruders for making polyolefins grafted with maleic anhydride (PP-g-AMA) has as a consequence the formation of modified polyolefins with a low degree of grafting and highly degraded, and therefore with lower polarity compared to the grafting process of ITA and/or its derivatives like MODIT to polyolefins considered in this invention.

It is necessary to point out that the use of an extruder in the procedure for the preparation of grafted polyolefins corresponds to a more effective melt mixing process, but in spite of that it produces a lower degree of grafting, that is, this process would have a low yield for the preparation of modified polyolefins with a high degree of grafting like that achieved in the case of the modified polyolefins developed in this invention using ITA and/or MODIT in a discontinuous mixer.

In the case of obtaining the nanocomposites, this invention comprises the use of hybrid clays or clays modified with an amine, octadecylamine (ODA), by means of an ion exchange reaction, that is, a procedure for intercalation in solution. The hybrid clays are used to obtain the so called "masterbatch," which consists in mixing the hybrid clay with the polyolefin, in the molten state, together with the modified polyolefins or compatibilizers of this invention, characterized by the degree of controlled monomer grafting on the polyolefin. The degree of grafting of the compatibilizer is specific for a type of hybrid or modified clay with the aim of preparing a nanocomposite with improved mechanical properties. In some cases, depending on the cation exchange capacity of the clay, it may need a compatibilizer with a higher or lower degree of grafting. The preparation of the nanocomposites is carried out in a manner similar to that described for the preparation of the modified polyolefins, that is, in a discontinuous mixer. Therefore the process comprises the melt mixing of a given amount of the masterbatch with the polyolefin that constitutes the matrix of the nanocomposite. The use of a discontinuous mixer corresponds to a procedure that differs from the process that uses specially designed extruders for preparing this kind of nanocomposite.

On the other hand, the procedure for obtaining microcomposites and polymer blends uses the compatibilizers or polar polyolefins developed in this invention. The procedure for preparing these microcomposites also corresponds to a procedure similar to that for the preparation of the polar polyolefins (compatibilizers) and nanocomposites.

Therefore the invention comprises procedures for obtaining:

Compatibilizer based on polypropylene grafted with ITA (PP-g-ITA) containing 0.5-2.0% by weight of ITA (Procedure 1) and the quantitative determination of the actual graft on the polyolefin (Procedure 1a).

Compatibilizer based on polypropylene grafted with MODIT (PP-g-MODIT) containing 0.5-2.0% by weight of MODIT (Procedure 2) and the quantitative determination of the actual graft on the polyolefin (Procedure 2a).

Nanocomposites from modified clays (clays intercalated with an amine like octadecylamine (ODA)) and PP-g-ITA or PP-g-MODIT compatibilizer of this invention (Procedure 3).

Microcomposites based on polyolefins and PP-g-ITA or PP-g-MODIT compatibilizer of this invention (Procedure 4).

Blends of polyolefin and PP-g-ITA or PP-g-MODIT compatibilizer of this invention (Procedure 5).

Procedure 1

Obtaining the Compatibilizer Polyolefin Grafted with Itaconic Acid (PP-g-ITA).

The compatibilizer, PP-g-ITA, is the polyolefin grafted with itaconic acid, and it is used in the process of obtaining nanocomposites, microcomposites and the polyolefin blends.

Polypropylene and other polyolefins were used as compounds based on homopolymers of ethylene and propylene, as well as copolymers of those homopolymers with alpha olefins.

The preparation of PP-g-ITA compatibilizer with different degrees of ITA grafting in the polyolefin comprises the following stages:

a) Dosing and mixing, in a discontinuoous mixer at 180-190° C. during 10-15 minutes at 75-90 rpm under a stream of inert gas such as nitrogen, for example, of:

i) polypropylene (PP) (90-99% by weight);

ii) itaconic acid (1-5% by weight);

iii) initiator such as dicumyl peroxide (0.5-1.0% by weight); and iv) antioxidants such as beta-hydroxytoluene or Irganox 1010® and Irgafos 168® in a 2/1 ratio (0.02-0.03% by weight).

b) Pressing at 4-6 MPa and 60-80° C. of the resultant mass from the discontinuous mixer to obtain 1-2-mm thick plates.

c) Grinding the pressed material obtained in stage (b) into rectangular pieces about 1 to 3 mm on each side.

From this material the sheet and/or film is obtained to determine quantitatively the percentage by weight of actual ITA graft on PP by infrared analysis.

Procedure 1a

Determination of the Actual ITA Grafting Degree on the Polypropylene Homopolymer.

The procedure for quantifying the percentage of actual ITA grafting on PP consists in preparing physical mixtures, in the molten state, of PP and ITA in the discontinuous mixing equipment under controlled temperature, time and mixing speed. The carbonyl index (CI) of the mixtures with different proportions of ITA on PP was determined, and from the average value of the CI for each of the mixtures a calibration curve was obtained that relates that CI value with the percentage of ITA graft present in the mixture (GITA). With this calibration it was possible to determine the percentage of actual ITA grafting on the PP. The CI was defined by the ratio of the intensity of the absorption bands centered at 1712 cm$^{-1}$ and 1788 cm$^{-1}$, corresponding to the acid and anhydride carbonyl groups of the ITA molecule, and the intensity of the absorption band centered at 1167 cm$^{-1}$, which corresponds to the absorption band of the $CH_3$ groups of the PP used as reference.

Procedure 2

Obtaining the Compatibilizer Polyolefin Grafted with MODIT (PP-g-MODIT).

The procedure for obtaining the compatibilizer based on polyolefin and grafted with the MODIT monomer is similar to that described for obtaining the PP-g-ITA compatibilizer (Procedure 1), but in stage (a) part (ii) the ITA monomer is replaced by MODIT.

Procedure 2a

Determination of the Degree of Actual MODIT Grafting on the Polypropylene homopolymer.

The determination of the degree of actual MODIT grafting on the polypropylene homopolymer is similar to that described for obtaining the degree of actual ITA grafting on the PP-g-ITA compatibilizer (Procedure 1a), replacing the ITA monomer by MODIT.

Procedure 3

Obtaining Nanocomposites Based on Modified Clays of the Smectic Type (Clays Intercalated with the Amine ODA) and PP-g-ITA or PP-g-MODIT Compatibilizer of this Invention.

It comprises the following stages:

a) Obtaining the hybrid clay by means of the organic modification of smectic clay through the cation exchange reaction with an amine such as ODA in an acid medium (pH 2.8-3.2, at 25-30° C.).

b) Preparation of the masterbatch, which comprises mixing the hybrid clay from stage (a) and the PP-g-ITA or PP-g-MODIT compatibilizer of this invention. This mixture, which contains a hybrid clay/compatibilizer ratio of 1/3, is made in a discontinuous mixer at 75-90 rpm, 190-195° C., during 10-15 minutes in a stream of an inert gas such as nitrogen.

c) Obtaining the nanocomposite by dilution of the masterbatch with polyolefin in a discontinuous mixer in the molten state and a composition between 1-5% of hybrid clay in the polyolefin.

Stage (a), obtaining the hybrid clay, is carried out according to the procedure developed and optimized as part of this invention and applicable to smectic type clays. The hybrid clay corresponds to a clay with its sheet layers more separated due to the partial replacement of the interlaminar cations of the clay by aliphatic chain amino groups. This greater separation of the sheet layers in the hybrid clay has been determined and verified by X-ray diffraction. The replacement of the interchangeable cations of the clay takes place through the cation exchange reaction, in this case using an aliphatic amine like ODA. The clay is hybrid due to the presence of an inorganic surface layer of cations in the clay and the organic layer corresponding to the replacement of the interlaminar cations in the clay by the aliphatic amine. The procedure for obtaining the hybrid clay comprises the mixing of the aqueous suspension of clay (8-10 g/l) and the alcoholic solution of the commercial amine (3.0-3.2 g/l), followed by its isolation by filtration. The optimization of this procedure involves considering the mixing parameters of the solutions used for obtaining the hybrid clay, that is time (2-3 h), mixing temperature (25-30° C.) and pH 2.8-3.2.

Stage (b), preparation of the masterbatch, is carried out in a discontinuous mixer in the molten state under controlled temperature (190-195° C.), time (10-15 min) and stirring (75-90 rpm). The components of the masterbatch are: i) hybrid clay, ii) PP-g-ITA or PP-g-MODIT compatibilizer of this invention, and iii) antioxidants. The weight ratio of hybrid clay/compatibilizer is 1/3 in the masterbatch. The antioxidant composition in the masterbatch can be between 0.02-0.03% by weight of the total masterbatch mass. This mixture is selective, that is, a compatibilizer with a fixed degree of grafting is recommended for a specific clay with the purpose of optimizing the distribution of the components in the masterbatch.

Stage (c), obtaining the clay nanocomposites, comprises the dispersion of the masterbatch by dilution with polyolefin in the molten state in the discontinuous mixer under controlled temperature, time and stirring (190-195° C., 10-15 min, 75-90 rpm). The result of this process is to obtain clays with a high degree of exfoliation, that is, a system composed of nanosheets of clay dispersed homogeneously in the polymer matrix. The degree of dilution of the clay includes the range of 1-5% by weight of hybrid clay in the nanocomposite. The process of dilution in the molten state is carried out in a discontinuous mixer in a stream of inert gas such as nitrogen whose function is to replace the oxidizing environment (air) in the mixer's chamber and prevent the oxidation of the polyolefin. Furthermore, 0.02-0.03% by weight of antioxidants like beta-hydroxytoluene or Irganox 1010® and Irgafos 168® were used in a 2/1 ratio in the mixer.

Procedure 4

Obtaining Microcomposites Based on Polyolefins and PP-g-ITA or PP-g-MODIT Compatibilizers of this Invention.

The procedure describes the preparation of PP microcomposites (40-90% by weight) using microparticles such as talc, natural and synthetic calcium carbonate, as well as cellulose fibers (10-60% by weight) as polyolefin reinforcing agents, PP-g-ITA or PP-g-MODIT compatibilizers of this invention (1.0-9.0% by weight) and an antioxidant such as beta-hydroxytoluene (BHT) or Irganox 1010® and Irgafos 168® in a 2/1 ratio (0.02-0.03% by weight), and it comprises the following stages:

a) Sequential dosing of PP, dry microparticles, PP-g-ITA or PP-g-MODIT compatibilizer of this invention, and antioxidant in a discontinuous mixer.
b) Mixing at 75-90 rpm of the mixture obtained in stage (a) at 190-195° C. during 10-15 minutes in a stream of an inert gas such as nitrogen, for example.
c) Pressing at 4-6 MPa and 60-80° C. of the resultant mass from the mixer.
d) Grinding the pressed material.

Stage (a), dosing the components of the composite, comprises addding i) PP 40-90% by weight, ii) microparticles 10-60% by weight, iii) compatibilizer PP-g-ITA or PP-g-MODIT, that is PP grafted with ITA or MODIT, 0-13% by weight, and iv) antioxidant such as BHT or Irganox 1010® and Irgafos 168®, for example, in a 2/1 ratio, 0.02-0.03% by weight. The function of the antioxidant is to prevent the degradation of the PP during the mixing process.

Stage (b) is carried out in a discontinuous mixer. Mixing the components of the composite, PP, microparticles, compatibilizer and antioxidant has the purpose of getting the microparticles to be distributed homogeneously in the molten polypropylene matrix. Once all the components of the composite have been added, mixing is continued for 10-15 minutes under a stream of inert gas, for example nitrogen, whose function is to displace the oxidizing air environment in the chamber and prevent the degradation of the polypropylene.

In stage (c) the resultant mass from stage (b) is pressed at 4-6 MPa and 60-80° C. to obtain pressed plates 1-2 mm thick that will finally go to stage (d), which is the grinding of the resultant plates.

Stage (d), grinding of the plates, is carried out by cutting manually or mechanically rectangular pieces approximately 1-3 mm on each side.

From this granular microcomposite the test specimens sized according to ASTM standards for determining its tensile properties (ASTM D 638) are obtained.

The procedure described in this invention for obtaining the PP microcomposites reinforced with natural calcium carbonate microparticles also comprises the use of traditional reinforcements like calcium carbonate, talc and cellulose fibers such as sawdust. Natural calcium carbonate has been obtained according to the procedure described in patent application CL2542-2004 by the authors of this invention, and it allows microparticles of natural calcium carbonate to be obtained from egg shells recovered from farming and industrial wastes.

At the same time, microcomposite without the PP-g-ITA or PP-g-MODIT compatibilizer of this invention was obtained for comparison purposes.

Procedure 5

Process for Obtaining Polyolefin Blends and PP-g-ITA or PP-g-MODIT Compatibilizer of This Invention.

The procedure for obtaining polyolefin blends using PP-g-ITA or PP-g-MODIT compatibilizer and nonfunctionalized and/or functionalized elastomer (EL) (elastomer grafted with ITA monomer, EL-g-ITA) comprises the following stages:

a) sequential dosing in a discontinuous mixer of:
   (i) polyolefin such as PP ZN340;
   (ii) nonfunctionalized elastomers (EL) such as ethylene-1-octene (Engage or Eng) copolymer, or styrene-b-(ethylene-co-butylene)-b-styrene (SEBS) copolymer, or ethylene-co-1-hexene ($PEC_6$) copolymer, or ethylene-co-1-octadecene ($PEC_{18}$) copolymer, and/or functionalized elastomers such as elastomers grafted with ITA (EL-g-ITA), such as Eng-g-ITA or SEBS-g-ITA or $PEC_6$-g-ITA or $PEC_{18}$-g-ITA;
   (iii) PP-g-ITA or PP-g-MODIT compatibilizer of this invention; and
   (iv) antioxidant such as BHT or Irganox 1010® and Irgafos 168® in a 2/1 ratio.
b) Mixing at 75-90 rpm of the composition obtained in stage (a) at 190-195° C. during 10-15 minutes in a stream of an inert gas, such as nitrogen, for example.
c) Pressing at 4-6 MPa and 60-80° C. of the resultant mass from the mixing.
d) Grinding of the pressed material.

Stage (a), dosing the components of the blend, includes adding:
   i) PP (70-90% by weight);
   ii) nonfunctionalized elastomer such as Eng or SEBS or $PEC_6$ or $PEC_{18}$ and/or functionalized elastomer EL-g-ITA such as Eng-g-ITA or SEBS-g-ITA or $PEC_6$-g-ITA or $PEC_{18}$-g-ITA (1.0-30.0% by weight). The functionalized elastomer has the purpose of allowing greater homogenization of the different phases of the blend;
   iii) PP-g-ITA or PP-g-MODIT compatibilizer of this invention (1.0-15.0% by weight); and
   iv) antioxidant (0.2-0.3% by weight). The function of the antioxidant is to prevent the degradation of the PP during the mixing process.

Stage (b) is carried out in a discontinuous mixer. The mixing of the components of the blend: PP, antioxidant, PP-g-ITA or PP-g-MODIT compatibilizer of this invention, and unfuncionalized elastomer (EL) and/or functionalized elastomer El-g-ITA has the purpose of getting the elastomer (disperse phase) to become distributed homogeneously in the molten PP matrix, and these functionalized elastomers are obtained by a procedure similar to the grafting of ITA on the polyolefin as described in procedure 1 "Obtaining the PP-g-ITA compatibilizer" of this invention. Once all the components of the blend have been added, mixing is continued during 10-15 minutes under a stream of inert gas, for example nitrogen, whose function is to displace the oxidizing air environment from the chamber and prevent the degradation of the polypropylene.

In stage (c) the resultant mass from stage (b) is pressed at 4-6 MPa and 60-80° C. to obtain pressed plates 2-4 mm thick and finally go to step (d), which is the grinding of the resultant plates.

Stage (d), grinding of the plates, is carried out by cutting manually or mechanically into rectangular pieces approximately 1-3 mm on each side.

From this granulated blend the test specimens sized according to ASTM standards for determining their tensile properties (ASTM D 638) are obtained.

At the same time, blend without the PP-g-ITA or PP-g-MODIT compatibilizer of this invention and/or without functionalized elastomer was obtained for comparison purposes.

EXAMPLES OF APPLICATIONS

The examples include the methodology for obtaining:
Polyolefin grafted with itaconic acid (PP-g-ITA) compatibilizer (Example 1) and determination of the degree of actual grafting on the polyolefin (Example 1a)
Polyolefin grafted with MODIT (PP-g-MODIT) compatibilizer (Example 2) and determination of the degree of actual grafting on the polyolefin (Example 2a)
Nanocomposites frome modified clays (clay intercalated with the amine ODA) and PP-g-ITA or PP-g-MODIT compatibilizer of this invention (Example 3).
Microcomposites based on polyolefins and PP-g-ITA or PP-g-MODIT compatibilizer of this invention and antioxidants (Example 4).
Polyolefin blends and PP-g-ITA or PP-g-MODIT compatibilizer of this invention (Example 5).

Example 1

Methodology for Obtaining the Polyolefin Grafted with Itaconic Acid (PP-g-ITA) Compatibilizer The organic compound or compatibilizer obtained in this invention comprises the polyolefin grafted with ITA with a controlled degree of grafting by means of a procedure developed in this invention. The raw materials for obtaining the compatibilizer are: i) commercial PP homopolymer ZN250 from Petroquim S.A.; ii) ITA from Sigma USA; iii) dicumyl peroxide initiator from Akzo USA, and iv) Irganox 1010® and Irgafos 168® antioxidants in a 2/1 ratio from Petroquim S.A.

A description is given in this example of the stages for obtaining a compatibilizer with 1.8% of ITA grafting on PP ZN250 and a total mass of 35 grams, equivalent to the capacity of the discontinuous mixer used, and it comprises:

a) dosing and mixing in a discontinuous mixer at 190° C., 75 rpm, and during 10 minutes under a stream of inert gas such as nitrogen of:
 i) PP ZN250 (33.77 grams; 96.48% by weight),
 ii) ITA (1.05 grams; 3.00% by weight),
 iii) dicumyl peroxide initiator (0.175 grams; 0.50% by weight), and
 iv) Irganox 1010® and Irgafos 168® antioxidant in a 2/1 ratio (0.07 grams; 0.02% by weight), b) pressing at 5 MPa and 70° C. of the resultant mass from the discontinuous mixer to obtain pressed plates 1-2 mm thick, and c) grinding the pressed material (PP-g-ITA compatibilizer) into rectangular pieces approximately 1-3 mm on each side.

Example 1a

Determination of the Degree of Actual Grafting of Itaconic Acid (ITA) in Polypropylene (PP)

The method for quantifying the percentage of actual grafting of ITA on PP for the PP-g-ITA compatibilizer consists in preparing physical mixtures, in the molten state, of PP and ITA in the Brabender Plasticorder model PL331 discontinuous mixing equipment. For that purpose three mixtures are made of PP ZN250 with ITA with compositions between 1.0% and 3.0% by weight of ITA (Table 1). These mixtures are processed in the discontinuous mixer during 6 min at 190° C. and 75 rpm in an inert atmosphere, for example nitrogen. The samples were then analyzed by Fourier transform infrared spectroscopy (FTIR). The carbonyl index (CI) of all of them was determined. The CI was defined as the ratio of the sum of the intensities of the FTIR absorption bands centered at 1712 cm$^{-1}$ and 1788 cm$^{-1}$, corresponding to the carbonyl groups and succinic anhydride of the ITA molecule, and the intensity of the FTIR absorption band centered at 1167 cm$^{-1}$, which corresponds to the absorption band of the CH$_3$ groups of the PP used as reference ($I_C = (A_{1712\ cm^{-1}} + A_{1788\ cm^{-1}})/A_{1167\ cm^{-1}}$. From the average value of the CI of each of the mixtures a calibration curve is obtained that relates that CI value with the percentage of ITA present in the mixture. With this curve it was possible to determine the percentage of actual grafting (GAI) of ITA on PP with different fluidity index (FI). Equation 1, obtained from the linear relation of the calibration curve, allows the GAI to be determined.

$$G_{AI}(\% \text{ by weight}) = I_C/0.3093 \quad \text{(Equation 1)}$$

In this way compatibilizers with 0.7, 1.0 and 1.8% of ITA graft or GAI value were obtained, that is, PP-g-ITA$_{0.7}$, PP-g-ITA$_{1.0}$ and PP-g-ITA$_{1.8}$, respectively, in the polypropylene ZN250 matrix. The proportions of the components of each of these compatibilizers together with the molecular weight and polydispersity are summarized in Tables 1 and 2, respectively.

The use of the compatibilizers to obtain nanocomposites, microcomposites and/or blends based on polyolefins is specific, and their mechanical and thermal properties are determined according to the degree of actual grafting of ITA on the polyolefin.

TABLE 1

Proportions of components (itaconic acid, dicumyl peroxide and PP ZN250) for preparing physical mixtures of PP with different percentages of ITA grafts.

| Physical Mixtures | Itaconic Acid (g) | (%) | Dicumyl Peroxide (g) | (%) | PP ZN250 (g) | (%) |
|---|---|---|---|---|---|---|
| Sample 1 | 1.050 | 3.0 | 0.175 | 0.5 | 33.775 | 96.5 |
| Sample 2 | 0.750 | 2.0 | 0.175 | 0.5 | 34.075 | 99.0 |
| Sample 3 | 0.350 | 1.0 | 0.175 | 0.5 | 34.479 | 99.4 |

TABLE 2

Molecular weight ($M_w$), polydispersity ($P_d$) and actual grafting of ITA on PP (ZN250) of compatibilizers in physical mixtures.

| Physical Samples | Compatibilizer Code | Actual graft % by weight | $M_w$ (kg/mol) | Pd ($M_w/M_n$) |
|---|---|---|---|---|
| Sample 1 | PP-g-A.IT$_{1.8}$ | 1.8 | 110 | 2.3 |
| Sample 2 | PP-g-A.IT$_{1.0}$ | 1.0 | 90 | 2.0 |
| Sample 3 | PP-g-A.IT$_{0.7}$ | 0.7 | 85 | 2.1 |

Example 2

Methodology for Obtaining the Compatibilizer of Polyolefin Grafted with MODIT (PP-g-MODIT)

Similar to application example 1, in which stage a) ii) is modified by replacing the ITA monomer by MODIT, thus obtaining PP-g-MODIT compatibilizer with a variable degree of actual grafting between 0.5 and 1.4% by weight in the PP ZN250 homopolymer.

Example 2a

Methodology for Determining the Degree of Actual Grafting of MODIT in the Polyolefin The determination of the degree of actual grafting of MODIT in the PP homopolymer is similar to that described for obtaining the degree of actual grafting of ITA in PP-g-ITA compatibilizer (Procedure 1a), replacing the ITA monomer by MODIT.

The MODIT monomer was prepared from the reaction of itaconic anhydride (1.0 mol) and 1-octadecyl alcohol (1.2 mol) in toluene as solvent at the reflux temperature of the latter. Reaction time was 2.5 hours. At the end of the reaction the solvent was removed in a rotary evaporator and the crude product obtained was recrystallized in a 50/50 v/v toluene/petroleum ether mixture. The purified product melts at a temperature of 86-88° C. and its purity was verified by proton nuclear magnetic resonance spectrometry ($^1$H NMR).

The physical mixtures of PP ZN250 and MODIT made for the determination of the degree of actual grafting of MODIT on PP comprised a composition between 0.5% and 5.0% by weight of MODIT (Table 3). These mixtures were processed in a manner similar to the procedure described for the PP-g-ITA compatibilizer, in the discontinuous mixer during 6 min, 75 rpm and 190° C. in an inert atmosphere of, for example, nitrogen. The samples were then analyzed by Fourier transform infrared spectroscopy (FTIR). In all of them the carbonyl index (CI) was determined. The CI is defined as the ratio of the sum of the intensities of the FTIR absorption bands centered at 1718 cm$^{-1}$, 1735 cm$^{-1}$ and 1778 cm$^{-1}$, corresponding to the representative groups of the MODIT molecule, and the intensity of the FTIR absorption band centered at 1164 cm$^{-1}$, which corresponds to the absorption band of the CH$_3$ groups of the PP used as reference. Table 4 shows the CI values for each of the mixtures prepared, the actual percentage of resultant MODIT grafting, and the code of each PP-g-MODIT$_x$ compatibilizer, where x represents the actual percentage of grafting, and following the same procedure as that used for the PP-g-ITA compatibilizer.

The use of the compatibilizers for obtaining the nanocomposites, microcomposites and/or blends based on polyolefins is specific, and its mechanical and thermal properties are determined according the degree of actual grafting of MODIT on the polyolefin.

TABLE 3

Proportions of components (MODIT, cumyl peroxide and PP ZN250) in physical mixtures for obtaining compatibilizers with different percentages of grafted MODIT.

| Physical mixtures | MODIT (%) | MODIT (g) | Cumyl peroxide (%) | Cumyl peroxide (g) | PP ZN250 (%) | PP ZN250 (g) |
|---|---|---|---|---|---|---|
| 1 | 0.5 | 0.175 | 0.5 | 0.175 | 99.0 | 34.65 |
| 2 | 1.0 | 0.350 | 0.5 | 0.175 | 98.5 | 34.48 |
| 3 | 2.0 | 0.700 | 0.5 | 0.175 | 97.5 | 34.13 |
| 4 | 3.0 | 1.050 | 0.5 | 0.175 | 96.5 | 33.78 |
| 5 | 5.0 | 1.750 | 0.5 | 0.175 | 94.5 | 33.08 |

TABLE 4

Carbonyl index and percentage of actual grafting of MODIT on PP in compatibilizers obtained from physical mixtures.

| Physical mixtures | IC | % actual grafting of MODIT on PP | Compatibilizer Code |
|---|---|---|---|
| 1 | 0.191 | 0.375 | PP-g-MODIT$_{0.4}$ |
| 2 | 0.263 | 0.516 | PP-g-MODIT$_{0.5}$ |
| 3 | 0.507 | 0.995 | PP-g-MODIT$_{1.0}$ |
| 4 | 0.696 | 1.366 | PP-g-MODIT$_{1.4}$ |
| 5 | 0.623 | 1.222 | PP-g-MODIT$_{1.2}$ |

Example 3

Methodology for Obtaining Nanocomposites Based on Modified Clays (Clay Intercalated with the Amine ODA) and the PP-g-ITA or PP-g-MODIT Compatibilizers of this Invention The polyolefin and smectic type clay nanocomposite is comprised of the following raw materials: i) polyolefin; ii) clay modified or intercalated with ODA; iii) PP-g-ITA or PP-g-MODIT compatibilizer of this invention, and iv) antioxidants.

(i) The polyolefins used were Ziegler-Natta polypropylene homopolymers from the Petroquim S.A. company, with fluidity indices (FI) between 1.8 and 26.0 (ZN340 and ZN150), as well as metallocene polypropylene homopolymers (Met 340 and Met 190) with the properties indicated in Table 5.

(ii) Clays of the smectic type such as montmorillonite (Mo) and natural (Hn) and synthetic (Hs) hectorite supplied by the Netherland Organisation for Applied Scientific Research—NTO of Holland (Table 6).

(iii) Compatibilizers: PP grafted with ITA or MODIT of this invention obtained according to procedures 1 and 2, respectively, of this invention.

(iv) Antioxidant: Beta-hydroxytoluene (BHT) or Irganox 1010® and Irgafos 168® in a 2/1 ratio, from the Petroquim S.A. company.

TABLE 5

Fluidity index (FI), average molecular weight ($\overline{Mw}$), polydispersity ($P_d$), elastic modulus (E), elastic limit ($\sigma_y$), deformation at breakage ($\epsilon$) and thermal stability ($T_{50}$) of Ziegler Natta (ZN) PP and metallocenes (Met) used in the invention.

| PP | IF | $\overline{Mw}$ (Kg./mol) | $P_d$ $\left(\dfrac{\overline{Mw}}{\overline{Mn}}\right)$ | AND (MPa) | $\sigma_y$ (MPa) | $\epsilon$ (%) | $T_{50}$ (° C.) |
|---|---|---|---|---|---|---|---|
| ZN 340 | 3 | 340 | 3.9 | 1090 ± 30 | 30 ± 1 | 250 | 319 ± 1 |
| ZN 250 | 13 | 250 | 3.4 | 1080 ± 40 | 30 ± 2 | 100 | 318 ± 1 |
| ZN 150 | 26 | 150 | 4.4 | 1092 ± 45 | 32 ± 2 | 20 | 319 ± 1 |
| Met 340 | — | 315 | 1.8 | 1116 ± 32 | 30 ± 1 | 375 | 319 ± 1 |
| Met 190 | — | 190 | 1.8 | 1102 ± 42 | 30 ± 2 | 100 | 319 ± 1 |

TABLE 6

Cation exchange capacity (CEC), interlaminar distance $D_{001}$ plane, elemental composition, and empirical formula of the clays used in the invention.

| Codee | Montmorillonite Mo | Natural Hectorite Hn | Synthetic Hectorit Hs |
|---|---|---|---|
| CEC (meq/100 g) | 83 | 100 | 95 |
| $D_{001}$ (Å) | 12.1 | 11.3 | 14.2 |
| $SiO_2$ (%) | 54.4 | 51.0 | 51.4 |
| $Al_2O_3$ (%) | 18.2 | 1.7 | <0.2 |
| $Na_2O$ (%) | 3.5 | 2.9 | 5.2 |
| $Li_2O$ (%) | <0.1 | 0.9 | 0.6 |
| $Fe_2O_3$ (%) | 3.5 | 0.6 | <0.1 |
| MgO (%) | 2.0 | 21.3 | 23.9 |
| CaO (%) | 0.6 | 1.8 | <0.1 |
| $K_2O$ (%) | 0.2 | 0.4 | <0.01 |
| Empirical formula | $M_{0.62}(Al_{1.58},Mg_{0.22})Si_4O_{10}(OH)_2 \cdot nH_2O$ | $M_{0.78}(Al_{0.16}Mg_{2.49},Li_{0.28})Si_4O_{10}(OH)_2 \cdot nH_2O$ | $M_{0.79}(Mg_{2.77},Li_{0.19})Si_4O_{10}(OH)_2 \cdot nH_2O$ |

This example describes the stages for obtaining a nanocomposite of polypropylene ZN340 (96.0% by weight); Mo hybrid clay (1.0% by weight) and PP-g-AIT$_{1.8}$ compatibilizer of this invention (3.0% by weight), which comprises the following preparation stages:

a) Mo hybrid clay;
b) hybrid clay-compatibilizer masterbatch; and
c) hybrid clay-compatibilizer-PP nanocomposite.

a) The preparation of hybrid Mo is achieved by means of the intercalation of the amine ODA in Mo clay, that is, a cation exchange reaction of Mo clay with the amine ODA in an acid environment (pH 3.0). For that purpose an aqueous dispersion of Mo is prepared using 5.0 grams of Mo in 500 ml of distilled water, stirring during 30 minutes. Separately, 1.6 g of ODA is dissolved in 500 ml of a 1/1 ethanol/water mixture at 70° C., adjusting to pH=3.0 with hydrochloric acid. Then the ODA solution is added to the aqueous dispersion of Mo, again adjusting the pH of this new resultant suspension at 3.0, and stirring is continued during 2.5 hours at 30° C. It is then filtered, washed with a 1/1 ethanol/water mixture, the filtrate is dried at 60° C. for 12 hours, and the resultant hybrid Mo is ground in a mechanical laboratory mill to Standard 325 mesh.

b) Preparation of the masterbatch, which comprises mixing i) 9.25 grams of the hybrid Mo obtained in stage (a); ii) 27.7 grams of PP-g-AIT$_{1.8}$ compatibilizer of this invention (1/3 hybrid Mo/compatibilizer ratio); and iii) 0.02 grams of BHT antioxidant and 0.02 grams of Irganox 1010® and Irgafos 168® antioxidant in a 2/1 ratio. The masterbatch is thus obtained in a discontinuous mixer at 100 rpm, 190° C. and 10 minutes in a stream of an inert gas such as nitrogen.

c) Obtaining the nanocomposite: It comprises mixing: i) 1.48 grams of masterbatch prepared in the previous stage; ii) 35.6 grams of PP ZN340; and iii) 0.02 grams of BHT and 0.02 grams of Irganox 1010® and Irgafos 168® in a 2/1 ratio as antioxidants. This mixing is carried out in a Brabender Plasticorder discontinuous mixer at 190° C., 75 rpm, during 10 min under a stream of an inert gas such as nitrogen, whose function is to dilute the oxidizing air environment in the chamber to prevent the degradation of the polypropylene. The resultant mass from the discontinuous mixer is then pressed at 5 MPa and 80° C., producing plates 1-2 mm thick which are finally ground into rectangular pieces approximately 1-3 mm on each side. From this ground nanocomposite the specimens for the tensile and thermal tests according to standards are obtained.

The same procedure described in this example of applications is valid for obtaining nanocomposites using other smectic clays such as Hn and Hs of Table 6, different PPs such as ZN250 and ZN150 of Table 5, and PP-g-AIT$_x$ or PP-g-MOD-IT$_x$ compatibilizers with different degrees of ITA or MODIT grafting on the PP. The nanocomposites obtained in this way will have a composition of 1, 3 and 5% by weight of hybrid Hn or Hs using a masterbatch with a hybrid clay/compatibilizer ratio of 1/3.

Similarly, the description of this example of application is also valid to obtain nanocomposites, for comparison purposes, using the PP-g-AMA compatibilizer instead of PP-g-AIT$_x$ or PP-g-MODIT$_x$ of this invention. The PP-g-AMA compatibilizer has 0.6% of maleic anhydride (MAA) grafted on the polyolefin. This is valid for all the smectic clays of Table 6, as well as the PPs cited in Table 5, and keeping the hybrid clay/PP-g-AMA weight ratio of 1/3 of the masterbatch, as well as the hybrid clay composition of 1.0 to 5.0% by weight.

Mechanical and Thermal Tests of the Nanocomposites.

The tests carried out to determine the mechanical and thermal properties of the nanocomposites of PP homopolymers and smectic hybrid clays were:

Thermal tests by thermogravimetric analysis that make it possible to obtain the thermal decomposition temperature measured as the temperature corresponding to a 50% weight loss, coded as "$T_{50}$" and referred to thermal stability.

Tensile tests according to ASTM D 638, to determine tensile mechanical properties like elastic modulus (E) in megapascals (MPa), and elastic limit (σy) in megapascals (MPa).

TABLE 7

Thermal stability ($T_{50}$) of nanocomposites obtained using 3% w/w of PP-g-ITA with different percentages of grafting as compatibilizer agent, and 1% of different hybrid clays. ($T_{50}$ PP = 319° C.)

| PP | % ITA in PP-g-AIT$_x$ | Mo $T_{50}$ (° C.) | Hn $T_{50}$ (° C.) | Hs $T_{50}$ (° C.) |
|---|---|---|---|---|
| ZN340 | x = 1.8 | 382 | 350 | 365 |
| | x = 1.0 | 378 | 362 | 369 |
| | x = 0.7 | 353 | 362 | 370 |
| ZN150 | x = 1.8 | 380 | 363 | 366 |
| | x = 1.0 | 376 | 366 | 368 |
| | x = 0.7 | 366 | 367 | 368 |

According to the thermal tests of the nanocomposites it can be established that:

The nanocomposites obtained using the compatibilizer of this invention, PP-g-ITA with different degrees of ITA grafting on the PP (0.7, 1.0 and 1.8% by weight of ITA on PP), have a thermal stability ($T_{50}$) greater than that of polypropylene alone. Furthermore, the thermal stability ($T_{50}$) of the nanocomposite is a function of the degree of actual grafting of ITA in the PP-g-ITA compatibilizer used, and it is also specific according to the type of smectic clay used (Table 7).

TABLE 8

Elastic modulus (E) and elastic limit ($\sigma_y$) of nanocomposites that comprise 3% by weight of PP-g-ITA compatibilizer and different percentages of actual ITA grafting and 1% by weight of hybrid Mo, Hn and Hs (*).

| PP | % ITA in PP-g-AIT$_X$ | Mo E (Mpa) | Mo $\sigma_y$ MPa | Hn E (MPa) | Hn $\sigma_y$ MPa | Hs E (Mpa) | Hs $\sigma_y$ MPa |
|---|---|---|---|---|---|---|---|
| ZN 340 | X = 1.8 | 1573 ± 25 | 42 ± 2 | 1723 ± 31 | 48 ± 2 | 1653 ± 23 | 41 ± 2 |
|  | X = 1.0 | 1523 ± 30 | 41 ± 2 | 1750 ± 22 | 48 ± 1 | 1748 ± 19 | 41 ± 1 |
|  | X = 0.7 | 1470 ± 18 | 40 ± 3 | 1850 ± 43 | 50 ± 2 | 1880 ± 15 | 46 ± 1 |
| ZN 150 | X = 1.8 | 2117 ± 35 | 40 ± 1 | 1791 ± 40 | 49 ± 2 | 1717 ± 25 | 40 ± 2 |
|  | X = 1.0 | 1941 ± 33 | 38 ± 2 | 2075 ± 35 | 48 ± 1 | 1855 ± 29 | 40 ± 1 |
|  | X = 0.7 | 1900 ± 42 | 38 ± 2 | 2137 ± 28 | 51 ± 2 | 1966 ± 19 | 45 ± 2 |

(*) Scientific publication: Macromol. Chem. Phys., 207, 1376-1386, August (2006). Use of PP grafted with itaconic acid as a new compatibilizer for PP/clay nanocomposites. Moncada E, Quijada R, Lieberwirth I, Yazdani-Pedram M.

TABLE 8A

Elastic modulus (E) and elastic limit ($\sigma_y$) of nanocomposites that comprise 3% by weight of PP-g-MODIT compatibilizer and different percentages of actual ITA grafting and 1% by weight of hybrid Mo, Hn and Hs.

| PP | % MODIT in PP-g-MODIT$_X$ | Mo E (Mpa) | Mo $\sigma_y$ (MPa) |
|---|---|---|---|
| ZN 340 | X = 1.4 | 1496 ± 33 | 38 ± 2 |
|  | X = 0.5 | 1367 ± 32 | 37 ± 1 |
| ZN 150 | X = 1.4 | 1591 ± 23 | 38 ± 2 |
|  | X = 0.5 | 1569 ± 36 | 38 ± 3 |

TABLE 9

Elastic modulus (E) and elastic limit ($\sigma_y$) of nanocomposites obtained with 1% by weight of different hybrid clays, 3% by weight of PP-g-AMA, and Ziegler-Natta PP homopolymers of different molecular weight. (*)

| PP | Mo E (MPa) | Mo $\sigma_y$ (MPa) | Hn E (MPa) | Hn $\sigma_y$ (MPa) | Hs E (MPa) | Hs $\sigma_y$ (MPa) |
|---|---|---|---|---|---|---|
| ZN340 | 1310 ± 32 | 34 ± 1 | 1550 ± 42 | 42 ± 1 | 1410 ± 43 | 39 ± 1 |
| ZN150 | 1415 ± 37 | 38 ± 3 | 1607 ± 32 | 43 ± 2 | 1405 ± 35 | 41 ± 2 |

E = Módulo Elástico.
$\sigma_y$ = Elastic limit
(*) Scientific publication: Macromol. Chem. Phys., 207, 1376-1386, August (2006). Use of PP grafted with itaconic acid as a new compatibilizer for PP/clay nanocomposites. Moncada E, Quijada R, Lieberwirth I, Yazdani-Pedram M.

According to the mechanical tests of the nanocomposites based on polyolefins, hybrid clays, and compatibilizers of this invention or PP-g-AMA compatibilizer, it can be established that:

Nanocomposites obtained using the PP-g-ITA compatibilizer of this invention have greater rigidity (E) (13.0 to 49.0%) and elastic limit (17.0 to 22.0%) than those made using the PP-g-AMA compatibilizer. This is valid for the nanocomposites with 1.0% by weight of the hybrid clays and the PPs used in this invention.

The rigidity (E) of the nanocomposites increases as the fluidity index of the PP used increases (6.0 to 15.0% increase) and also as the degree of actual grafting of MODIT in the PP-g-MODIT compatibilizer increases (5.0 to 10.0% increase).

The rigidity (E) and elastic limit of the nanocomposites based on polyolefins (ZN340 or ZN150), the PP-g-ITA compatibilizer of this invention, and clays (Mo or Hn) is a function of the degree of actual grafting of the ITA on the PP to obtain such nanocomposites.

The rigidity (E) of the nanocomposites based on polyolefins (ZN340 or ZN150), PP-g-AIT$_{0.6}$ or PP-g-MODIT$_{0.5}$ compatibilizer of this invention, and Mo or Hn hybrid clays is greater (5.0 to 49.0% increase) than that corresponding to nanocomposites obtained using the PP-g-AMA compatibilizer with 0.6% actual grafting of AMA on the PP.

Nanocomposites that use compatibilizers of this invention can be applied in fields in which the rigidity requirements are more demanding than in the fields of application of the nanocomposites that use the PP-g-AMA compatibilizer.

Example 4

Methodology for Obtaining Microcomposites Based on Polyolefins and PP-g-AIT$_x$ or PP-g-MODIT$_x$ Compatibilizers of this Invention The microcomposites based on polypropylene (PP) with microparticles and the PP-g-AIT$_x$ or PP-g-MODIT$_x$ compatibilizer of this invention considered the use of the commercial Ziegler-Natta PPs of Table 5 and the microparticles shown in Table 10.

TABLE 10

Particle size and surface area of microparticles.

| Micropartices | Code | Particle size (μm) d(10) | d(50) | D(90) | Surface area BET (m²/g) |
|---|---|---|---|---|---|
| Synthetic calcium carbonate | CC 2 | 0.4 | 2.0 | 10.2 | 3.2 |

TABLE 10-continued

Particle size and surface area of microparticles.

| Microparticles | Code | Particle size (μm) | | | Surface area |
| --- | --- | --- | --- | --- | --- |
| | | d(10) | d(50) | D(90) | BET (m$^2$/g) |
| Talc | TA 2 | 0.7 | 2.4 | 6.5 | 6.3 |
| Natural calcium carbonate | ES400 | 8.4 | 1.7 | 27.5 | 18.2 |

This example describes the stages for obtaining a microcomposite of PP ZN250 with 40% by weight of ES400 natural calcium carbonate microparticles (obtained according to procedure described in patent application CL2542-2004 by the authors of this invention), and PP-g-AIT$_{0.7}$ compatibilizer of this invention, for a total mass of 35 grams, equivalent to the capacity of the discontinuous mixer used, and it comprises:

a) Sequential dosing and mixing, in a discontinuous mixer at 190° C. during 10 minutes and at 75 rpm under a stream of an inert gas such as nitrogen, of the components of the microcomposite:

i) PP ZN250 (20.6 grams);

ii) PP-g-AIT$_{0.7}$ compatibilizer of this invention (0.35 grams);

iii) Irganox 1010® and Irgafos 168® antioxidant in 2/1 ratio (0.048 grams); and iv) Dry ES400 microparticles (14.0 grams).

b) pressing at a 5 MPa and 80° C. of the resultant mass from the mixing in the discontinuous mixer to obtain pressed plates 1-2 mm thick, and c) grinding the resultant pressed material or microcomposite of polypropylene with 40% by weight of ES400 microparticles into rectangular pieces approximately 1-3 mm on each side.

The same procedure is valid for microcomposites based on PP ZN340 and ZN250 with 40% by weight of microparticles of CC2 or TA2 or cellulose fibers such as sawdust and 1.0 to 9.0% by weight of PP-g-AIT$_{0.6}$ or PP-g-MODIT$_{0.5}$ compatibilizer of this invention.

Similarly, for comparison purposes and with the same methodology, PP-microparticles microcomposites and without compatibilizer were obtained. Microcomposites of PP-microparticles that use compatibilizers such as PP-g-AMA$_{0.6}$ were also obtained to evaluate the comparative advantages of the PP-g-AIT$_{0.6}$ or PP-g-MODIT$_{0.5}$ compatibilizers of this invention on the mechanical properties of the microcomposite.

The mechanical tests made with the microcomposites obtained were tensile tests according to ASTM D 638, to determine tensile mechanical properties such as elastic modulus (E) in megapascals (MPa), elastic limit ($\sigma y$) in megapascals (MPa), and elongation at breakage in %.

TABLE 11

Elastic modulus (E), elastic limit ($\sigma_y$) and elongation at breakage ($\in$) of microcomposites obtained with PP ZN250 and microparticles (40% by weight) of talc (TA2) or calcium carbonate (ES400) and PP-g-AIT$_{0.6}$ or PP-g-MODIT$_{0.5}$ compatibilizer of this invention and PP-g-AMA$_{0.6}$

| Compatibilizer | | PP ZN250 - TA2 | | | PP ZN250 - ES400 | | |
| --- | --- | --- | --- | --- | --- | --- | --- |
| | % by | (40% by weight) | | | (40% by weight) | | |
| Type | weight | E (MPa) | $\sigma_y$ (MPa) | $\in$ (%) | E (MPa) | $\sigma_y$ (MPa) | $\in$ (%) |
| PP-g-AMA$_{0.6}$ | 0 | 2370 ± 41 | 27 ± 1 | 3 | 1582 ± 17 | 23 ± 1 | 3 |
| | 3 | 2441 ± 39 | 32 ± 3 | 3 | 1835 ± 18 | 31 ± 1 | 4 |
| | 6 | 2577 ± 42 | 32 ± 2 | 3 | 1833 ± 18 | 31 ± 3 | 4 |
| | 9 | 2561 ± 60 | 34 ± 3 | 3 | 1825 ± 16 | 32 ± 1 | 5 |
| PP-g-AIT$_{0.6}$ | 0 | 2370 ± 41 | 27 ± 1 | 3 | 1582 ± 17 | 23 ± 1 | 3 |
| | 3 | 2429 ± 41 | 30 ± 1 | 2 | 1866 ± 30 | 27 ± 2 | 3 |
| | 6 | 2484 ± 45 | 32 ± 2 | 3 | 1897 ± 18 | 28 ± 2 | 3 |
| | 9 | 2588 ± 67 | 34 ± 3 | 3 | 1853 ± 11 | 28 ± 1 | 3 |
| PP-g-MODIT$_{0.5}$ | 0 | 2370 ± 41 | 27 ± 1 | 3 | 1582 ± 17 | 23 ± 1 | 3 |
| | 3 | 2430 ± 30 | 28 ± 1 | 3 | 1796 ± 30 | 24 ± 5 | 3 |
| | 6 | 2425 ± 58 | 28 ± 1 | 3 | 1812 ± 58 | 27 ± 2 | 3 |
| | 9 | 2470 ± 78 | 28 ± 1 | 3 | 1798 ± 78 | 28 ± 1 | 4 |

The mechanical properties of the microcomposites of polyolefins containing microparticles of natural calcium carbonate ES400 or talc TA2 and PP-g-AIT$_{0.6}$ or PP-g-MODIT$_{0.5}$ compatibilizer of this invention or PP-g-AMA show that:

The rigidity (E) and elastic limit increase as the proportion of PP-g-AIT$_{0.6}$ or PP-g-MODIT$_{0.5}$ compatibilizer of this invention (10.0 to 20.0% increase for E and 4.0 to 30.0% increase for the elastic limit) or of PP-g-AMA$_{0.6}$ compatibilizer increases (from 1.0 to 9.0% by weight) (5.0 to 10.0% increase of E and 4.0 to 25.0% increase of the elastic limit).

The rigidity (E) and elastic limit of microcomposites that use the PP-g-AIT$_{0.6}$ or PP-g-MODIT$_{0.5}$ compatibilizer of this invention are greater than those of the similar microcomposite without compatibilizer (10.0 to 20.0% increase of E and 4.0 to 30.0% increase of the elastic limit).

The rigidity (E) and elastic limit of the microcomposites that use the PP-g-AIT$_{0.6}$ or PP-g-MODIT$_{0.5}$ compatibilizer of this invention increases in a higher proportion when the proportion of compatibilizer increases from 1.0 to 9.0% by weight, compared with the increase of E and elastic limit of the microcomposites that use the PP-g-AMA$_{0.6}$ compatibilizer in the same composition range.

The microcomposites obtained using the compatibilizers of this invention can be applied in fields in which the requirements of rigidity are similar or more demanding than in the fields of application of the microcomposites obtained using the PP-g-AMA compatibilizer.

Example 5

Methodology for Obtaining Polyolefin Blends and PP-g-ITA or PP-g-MODIT Compatibilizer of this Invention The components of the polyolefin blends are: i) polyolefins; ii) unmodified or modified elastomers; iii) compatibilizers of this invention; and iv) antioxidant.
  i) Polyolefins: commercial Ziegler-Natta polypropylenes of Table 5.
  ii) Unmodified elastomers: a) nonmetallocenes: ethylene-1-octene copolymers (Engage) and copolymer of styrene-b-(ethylene-co-butylene)-b-styrene (SEBS); and b) metallocenes: ethylene-co-1-hexene copolymer ($PEC_6$), ethylene-co-1-octadecene copolymer ($PEC_{18}$) (Table 12).
Modified elastomers were also used as additional compatibilizers to achieve better homogenization of the phases in the polyolefin blend, and they comprise the grafting of ITA (0.7% degree of grafting) on the elastomer (EL-g-ITA) such as Eng-g-ITA or SEBS-g-ITA or $PEC_6$-g-ITA or $PEC_{18}$-g-ITA.
  iii) Compatibilizer: PP-g-ITA or PP-g-MODIT of this invention.
  iv) Antioxidant: Beta-hydroxytoluene (BHT) or Irganox 1010® and Irgafos 168® in a 2/1 ratio, from the Petroquim S.A. company.

TABLE 12

Molecular weight (Mw) and polydispersity ($P_d$) and incorporation of elastomers used in this invention.

| Elastomer | Mw (g/mol) | $P_d$ Mw/Mn | Incorporation (mol %) |
|---|---|---|---|
| PEC6 | 60 000 | 1.7 | 19.4 |
| PEC18 | 71 000 | 2.0 | 12.2 |
| Engage | 94 000 | 2.6 | n.d. |
| SEBS | 42 000 | 1.1 | n.d. | n.d. = not determined

This example describes the stages for the preparation of the blend based on PP ZN340, nonfunctionalized elastomer (30% by weight) and PP-g-$AIT_{0.7}$ compatibilizer of this invention (10% by weight) for a total mass of 35 grams, equivalent to the capacity of the discontinuous mixer used, and it comprises:
a) sequential dosing and mixing in a discontinuous mixer at 190° C. and 75 rpm during 10 minutes under a stream of inert gas such as nitrogen, of the components of the blend:
  i) PP ZN340 (20.6 grams);
  ii) PP-g-$AIT_{0.7}$ compatibilizer of this invention (0.35 grams);
  iii) antioxidant Irganox 1010® and Irgafos 168® in a 2/1 ratio (0.048 grams); and
  iv) Engage unfunctionalized elastomer (14.0 grams).
b) pressing at a 5 MPa and 80° C. of the resultant mass of the mixing in the discontinuous mixer to obtain pressed plates 1-2 mm thick, and
c) grinding the resultant pressed material or blend into rectangular pieces approximately 1-3 mm on each side.

The same procedure is valid for obtaining blends based on PP ZN340 with elastomer such as SEBS, $PEC_6$, $PEC_{18}$, and PP-g-$AIT_{0.6}$ or PP-g-$MODIT_{0.5}$ compatibilizer of this invention. Blends were also obtained based on PP ZN340, PP-g-$AIT_{0.6}$ or PP-g-$MODIT_{0.5}$ compatibilizer of this invention, and with functionalized elastomers such as SEBS-g-ITA, $PEC_6$-g-ITA and $PEC_{18}$-g-ITA as additional compatibilizers.

Furthermore, for the purpose of comparison, mixtures of PP-elastomer unfunctionalized and without compatibilizer were also obtained using the same methodology.

The mechanical tests carried out with the reference mixtures and blends obtained, as detailed in Table 13, were:
i) tensile tests according to ASTM D 638 to determine tensile mechanical properties such as Young's modulus (E) in megapascals (MPa), elastic limit ($\sigma y$) in megapascals (MPa) and elongation at breakage in %, and
ii) impact resistance (ASTM D 256) to determine impact resistance (J/m).

TABLE 13

Components (PP, PP-g-ITA compatibilizer, compatibilized elastomer EL-g-ITA and elastomer EL) and composition (porcentage by weight) of reference mixtures and blends obtained in the invention.

| Mixture | PP ZN340 | PP-g-ITA | EL-g-ITA | EL |
|---|---|---|---|---|
| Reference PP | 100 | 0 | 0 | 0 |
| Reference EL | 0 | 0 | 0 | 100 |
| Reference 1 | 70 | 0 | 0 | 30 |
| Blend 1 | 60 | 10 | 0 | 30 |
| Blend 2 | 60 | 10 | 10 | 20 |
| Blend 3 | 70 | 0 | 10 | 20 |

TABLE 14

Elastic modulus (E), elastic limit ($\sigma_y$) and elongation at breakage ($\epsilon$) of PP ZN 340/Eng 70/30 blends without compatibilizer and compatibilized with 10% PP-g-ITA and/or Eng-g-ITA.

| Mixture | PP-PP-g-ITA-Eng-g-ITA-Eng (% by weight) | E (MPa) | $\sigma_y$ (MPa) | $\epsilon$ (%) |
|---|---|---|---|---|
| Reference PP | 100-0-0-0 | 1222 ± 42 | 32 ± 3 | 375 ± 88 |
| Reference EL | 0-0-0-100 | 153 ± 21 | 5 ± 1 | 588 ± 66 |
| Reference 1 | 70-0-0-30 | 693 ± 27 | 27 ± 1 | 205 ± 80 |
| Blend 1 | 60-10-0-30 | 837 ± 80 | 16 ± 1 | 213 ± 68 |
| Blend 2 | 60-10-10-20 | 930 ± 84 | 31 ± 2 | 181 ± 61 |
| Blend 3 | 70-0-10-20 | 780 ± 56 | 28 ± 3 | 206 ± 21 |

TABLE 15

Elastic modulus (E), elastic limit ($\sigma_y$) and elongation at breakage ($\epsilon$) of PP ZN 340/Eng 70/30 blends without compatibilizer and compatibilized with 10% PP-g-MODIT and/or Eng-g-MODIT.

| Mixture | PP-PP-g-MODIT-Eng-g-MODIT-Eng (% by weight) | E (MPa) | $\sigma_y$ (MPa) | $\epsilon$ (%) |
|---|---|---|---|---|
| Reference PP | 100-0-0-0 | 1222 ± 42 | 32 ± 3 | 375 ± 88 |
| Reference EL | 0-0-0-100 | 153 ± 21 | 5 ± 1 | 588 ± 66 |
| Reference 1 | 70-0-0-30 | 693 ± 27 | 27 ± 1 | 205 ± 80 |
| Blend 1 | 60-10-0-30 | 722 ± 40 | 20 ± 1 | 122 ± 2 |
| Blend 2 | 60-10-10-20 | 840 ± 30 | 23 ± 1 | 117 ± 5 |
| Blend 3 | 70-0-10-20 | 739 ± 29 | 21 ± 1 | 137 ± 13 |

TABLE 16

Elastic modulus (E), elastic limit ($\sigma_y$) and elongation at breakage ($\epsilon$) of PP ZN340/SEBS 70/30 blends without compatibilizer and compatibilized with 10% PP-g-ITA and/or SEBS-g-ITA.

| Mixture | PP-PP-g-ITA-SEBS-g-ITA-SEBS (% by weight) | E (MPa) | $\sigma_y$ (MPa) | $\epsilon$ (%) |
|---|---|---|---|---|
| Reference PP | 100-0-0-0 | 1222 ± 42 | 32 ± 3 | 375 ± 88 |
| Reference EL | 0-0-0-100 | 6 ± 1 | 12 ± 2 | 623 ± 85 |
| Reference 1 | 70-0-0-30 | 790 ± 1 | 25 ± 2 | 266 ± 32 |
| Blend 1 | 60-10-0-30 | 865 ± 20 | 23 ± 3 | 172 ± 30 |
| Blend 2 | 60-10-10-20 | 985 ± 67 | 24 ± 1 | 53 ± 12 |
| Blend 3 | 70-0-10-20 | 906 ± 18 | 26 ± 2 | 133 ± 33 |

TABLE 17

Elastic modulus (E), elastic limit ($\sigma_y$) and elongation at breakage ($\epsilon$) of ZN 340/PEC6 70/30 blends without compatibilizer and compatibilized with 10% of PP-g-ITA and/or PEC6-g-ITA.

| Mixture | PP-PP-g-ITA-PEC6-g-ITA-PEC6 (% by weight) | E (MPa) | $\sigma_y$ (MPa) | $\epsilon$ (%) |
|---|---|---|---|---|
| Reference PP | 100-0-0-0 | 1222 ± 42 | 32 ± 3 | 375 ± 88 |
| Reference EL | 0-0-0-100 | 23 ± 11 | 3 ± 1 | 982 ± 100 |
| Reference 1 | 70-0-0-30 | 653 ± 60 | 18 ± 1 | 346 ± 26 |
| Blend 1 | 60-10-0-30 | 675 ± 22 | 17 ± 2 | 380 ± 42 |
| Blend 2 | 60-10-10-20 | 724 ± 60 | 19 ± 1 | 389 ± 27 |
| Blend 3 | 70-0-10-20 | 698 ± 73 | 18 ± 1 | 369 ± 56 |

TABLE 18

Elastic modulus (E), elastic limit ($\sigma_y$) and elongation at breakage ($\epsilon$) of PP ZN340/PEC18 70/30 blends without compatibilizer and compatibilized with 10% of PP-g-ITA and/or PEC18-g-ITA.

| Mixture | PP-PP-g-ITA-PEC18-g-ITA-PEC18 (% by weight) | E (MPa) | $\sigma_y$ (MPa) | $\epsilon$ (%) |
|---|---|---|---|---|
| Reference PP | 100-0-0-0 | 1222 ± 42 | 32 ± 3 | 375 ± 88 |
| Reference EL | 0-0-0-100 | 39 ± 42 | n.d.* | 643 ± 70 |
| Reference 1 | 70-0-0-30 | 804 ± 41 | 19 ± 1 | 40 ± 48 |
| Blend 1 | 60-10-0-30 | 799 ± 79 | 19 ± 2 | 79 ± 51 |
| Blend 2 | 60-10-10-20 | 917 ± 63 | 22 ± 1 | 80 ± 60 |
| Blend 3 | 70-0-10-20 | 886 ± 55 | 19 ± 1 | 76 ± 34 |

*n.d. = not determined

TABLE 19

Impact resistance (J/m) of the PP ZN340/Elastomer blends using PP and/or elastomer functionalized with ITA as compatibilizer.

| Mixture | PP-PP-g-ITA-EL-g-ITA-EL (% by weight) | PEC6 | PEC18 | Eng | SEBS |
|---|---|---|---|---|---|
| Reference PP | 100-0-0-0 | 20 ± 3 | 20 ± 3 | 20 ± 3 | 20 ± 3 |
| Reference 1 | 70-0-0-30 | 107 ± 7 | 30 ± 4 | 42 ± 3 | 62 ± 30 |
| Blend 1 | 60-10-0-30 | 109 ± 10 | 33 ± 3 | 51 ± 16 | 92 ± 22 |
| Blend 2 | 60-10-10-20 | 115 ± 30 | 35 ± 2 | 62 ± 10 | 110 ± 21 |
| Blend 3 | 70-0-10-20 | 101 ± 35 | 35 ± 2 | 53 ± 14 | 90 ± 19 |

According to the mechanical tests of the blends based on polyolefins and compatibilizers of this invention it can be established that there is:

Increased rigidity (E) (5.0 to 20.0% increase) and elongation at breakage (10.0 to 90.0% increase) when using the PP-g-ITA or PP-g-MODIT compatibilizer of this invention for obtaining the PP-EL blend.

Increased rigidity (E) (10.0 to 35.0% increase), elastic limit (5.0 to 15.0% increase) and elongation at breakage (12.0 to 90.0% increase) when the elastomers functionalized with the itaconic acid monomer are added as compatibilizers with respect to the PP-EL blend.

Greater rigidity (E) of the PP-EL blend (25% increase) when an elastomer with a longer side chain is used, in increasing order for $PP/PEC_6 < PP/Engage < PP/PEC_{18}$.

Increased impact resistance (10.0 to 80.0%) when adding the functionalized elastomers to the PP-EL blend.

Greater impact resistance (10.0 to 50.0% increase) for PP-EL blends that contain PP-g-AIT, polymers grafted with ITA of this invention than those PP-EL blends that do not contain it.

The blends obtained using compatibilizers of this invention can be applied in fields in which the rigidity and elongation at breakage requirements are more demanding than in the fields of application of the blends without compatibilizer.

The invention claimed is:

1. A compatibilizer comprising polypropylene grafted in a molten state with itaconic acid (ITA) or monooctadecyl itaconate (MODIT), with a degree of grafting in an interval between 0.5% and 2.8% and molecular weight variation less than 30% for any degree of grafting;
   wherein the compatibilizer comprises free carboxylic acid and/or anhydride groups which promote interaction with polar groups of inorganic fillers used as reinforcements for obtaining polymeric microcomposites, nanocomposites, and polymeric beads.

2. The compatibilizer according to claim 1, wherein the polyolefin homopolymers of ethylene or copolymers of ethylene or propylene with alpha olefins.

3. The compatibilizer according to claim 1, wherein the polypropylene is a heterophasic polypropylene or homopolymer of propylene with melt flow index between 1.8 and 26.0.

4. A nanocomposite, microcomposite, or polyolefin blend comprising the compatibilizer of claim 1.

5. The compatibilizer according to claim 1, produced by a process comprising:
   a) dosing and mixing, in a discontinuous mixer, at 180-195° C. and 75-90 rpm for 10-15 minutes and under a stream of an inert gas, of:
      i) polypropylene in a molten state, in a range of 92-98% by weight;
      ii) itaconic acid (ITA) or monooctadecyl itaconate (MODIT), in a range of 1-7% by weight;
      iii) an initiator comprising dicumyl peroxide in a range of 0.5-1.0% by weight, and iv) an antioxidant comprising beta-hydroxytoluene (BHT) or pentaerythritol tetrakis(3,5-di-tert-butyl-4-hydroxyphenyl-propenoate) and tris(2,4-di-tert-butylphenyl) phosphite in a 2/1 ratio, and in a range of 0.02-0.03% by weight;
b) pressing the resultant material of stage (a) at a pressure of 4-6 MPa, in a range of 60-80° C. to obtain laminates about 1-2 mm thick;
c) grinding the pressed material from stage (b) into rectangular pieces about 1-3 mm on each side to form a sheet or film; and
d) determining the weight percentage of grafting of ITA or MODIT in polypropylene in the sheet or film obtained in stage (c) by infrared analysis.

6. The compatibilizer according to claim 1, wherein the compatibilizer comprises polypropylene grafted in the molten state with MODIT.

* * * * *